Feb. 16, 1937.　　H. NIEDERREITHER　　2,070,612
METHOD OF PRODUCING, STORING, AND DISTRIBUTING ELECTRICAL
ENERGY BY OPERATING GAS BATTERIES, PARTICULARLY
OXY-HYDROGEN GAS BATTERIES AND ELECTROLYZERS
Filed March 18, 1933　　2 Sheets-Sheet 2

INVENTOR
HANS NIEDERREITHER
BY Sturtevant, Mason + Porter
ATTORNEYS.

Patented Feb. 16, 1937

2,070,612

UNITED STATES PATENT OFFICE 2,070,612

METHOD OF PRODUCING, STORING, AND DISTRIBUTING ELECTRICAL ENERGY BY OPERATING GAS BATTERIES, PARTICULARLY OXY-HYDROGEN GAS BATTERIES AND ELECTROLYZERS

Hans Niederreither, Munich, Germany

Application March 18, 1933, Serial No. 661,630
In Germany March 19, 1932

6 Claims. (Cl. 136—86)

The invention relates to a method of producing, storing and distributing electrical energy by operating gas batteries particularly oxy-hydrogen batteries and electrolyzers.

The disadvantages residing in the high outlay costs or the like of the hitherto usual storing methods for electrical energy which operate with pumps and storing means, reservoirs, or accumulators or the like are avoided according to the invention in that for the storage and distribution of electrical energy, this is transferred by means of insoluble and invariable electrodes to an aqueous or molten solution from which an energy carrier which is capable of being stored is produced and is kept ready in special storing means in order as required to reconvert it to the starting material electrochemically by means of insoluble electrodes with evolution of electrical energy. For this purpose pressures of, for example, 30–200 atmospheres and more are employed. In order to compress the gas to this high pressure it is true that energy must be expended, but this expenditure of energy is compensated by an increase of the electromotive force of the gas battery induced by the high gas pressure.

The advantage of operating the gas batteries under increased pressures resides in the fact that the current strength of the elecertic current produced per unit of the electrode surface increases in accordance with the pressure. As a result the outlay cost per unit of energy produced is reduced to a great extent. A further reduction of the outlay costs is further brought about, however, in that the cell volumes, gas electrolyte- and gas-conduits can be kept extremely small corresponding to the high pressure whereby a considerable economy in materials of construction is attained. The reduction can be effected in all spaces in which gas or gas electrolyte is contained and in all cross sections through which the gas or gas electrolyte is conducted, namely in all cell spaces or electrode spaces, gas spaces, gas conduits, gas electrolyte spaces and conduits. The reduction of the cross sections of all spaces through which the gas or gas electrolyte is passed can be effected theoretically proportionately to the increase of pressure. In practice, however, this is limited in that the cross sections of the spaces and channels must in each case be made sufficiently large that disturbances of the electrolyte circulation, deficiency of electrolyte, obstruction by foreign bodies or other disturbances in operation cannot occur. Accordingly for a pressure of 100 atmospheres, the spaces and so forth are not reduced to 1/100th but only to 1/10th to 1/30th. But even this reduction is sufficient to secure an important economy in the manufacturing costs. When using pressure of the order of magnitude of 10 to 30 atmospheres and if desired also, even with higher pressures, the reduction given theoretically will satisfy the requirements of practice.

A further advantage of operating gas batteries under increased pressure resides in the fact that by this means, according to the invention the temperature of the electrolytes can be maintained far above the boiling point of the electrolytes at atmospheric pressure for the purpose of increasing the reaction velocity, although it is to be kept under the boiling point of the electrolytes at the increased operating pressure.

The product which forms the energy carrier can consist of solid, liquid or gaseous material and according to this invention it can be transported in one of these forms to the place where the current is required. If the product is in gaseous form it can be stored according to the invention in this form as an energy carrier and then be made available again. Instead of this for storing or transport purposes it can also be liquefied or brought into solid condition or at least it may be compressed whereby, in each case, the storing and transport costs are smaller.

When using a gaseous product the method according to the invention is advantageously carried out, for example, by means of the known electrolytic decomposition of conducting liquids, such for example as water electrolysis, alkali chloride electrolysis and so forth, whereby the gases produced form the energy carriers and are stored for example in gaseous state in gas holders or in liquid state in flasks, Dewar vessels and so forth and if desired, also when required converted again into electrical energy in the known combustible material elements.

In carrying out by the method known per se the electrolytic decomposition of aqueous solution the high pressure is produced with practically no cost. Apart from that the costs of storing per unit volume of the gas under high pressure are less than the costs of storing for the same quantity of gas at atmospheric pressure in ordinary gas holders.

The gas produced and maintained under high pressure can be transported in conduits, under high pressure if energy produced at one power station is to be supplied as a peak energy supply to other works.

The process of storing can be particularly employed when the excess of energy is to be used later during a "peak" demand. One and the same apparatus provided with storing means can then be alternately utilized for pressure electrolysis and as a combustible material element for regeneration or re-conversion. In order to make the so-called pressure decomposer suitable for obtaining electrical energy by electrochemical re-conversion of the gases produced in it, hydrogen and oxygen, it is only necessary to provide the electrodes with suitable active layers and to provide the decomposer itself with means, for example a pump, which enables the gases to mix with the electrolyte and to circulate in the decomposer.

Such an apparatus according to the invention advantageously operates with pressures up to 200 atmospheres and even above that. The efficiency in the decomposition of the water amounts to between about 70 and 80 per cent according to the output and the efficiency in the recovery of electrical energy likewise amounts to about 70-80 per cent. The total efficiency of the storing and distributing process amounts therefore to between 49 and 64 per cent. By limiting the output the efficiency can be raised still higher.

An embodiment by way of example of the process according to the invention is diagrammatically illustrated in the drawings in which Figure 1 shows the whole arrangement for a so-called combustion material element or a pressure decomposer according to the invention with connected storing devices for high pressure of, for example 200 atmospheres.

Figure 1:
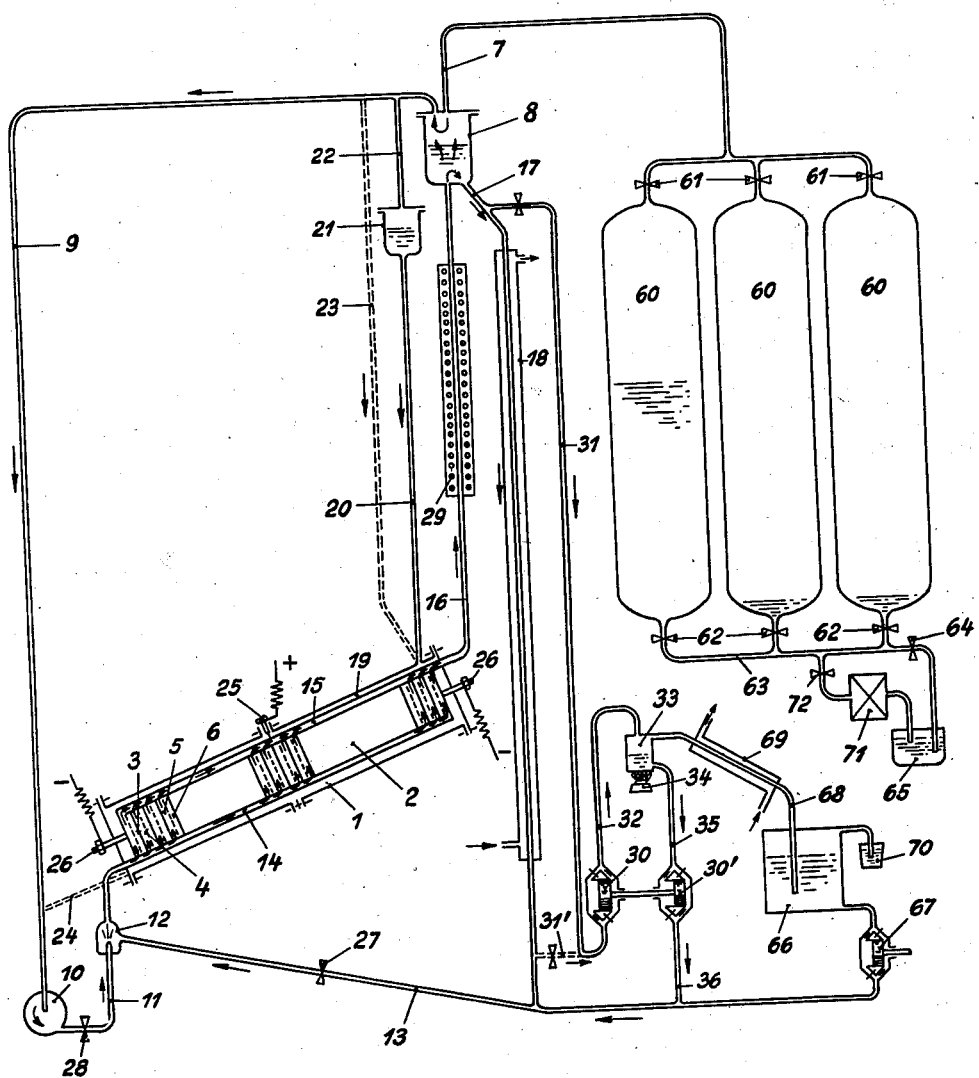

Figure 1 shows only one gas and electrolyte circuit and it is to be supposed that the same arrangement is used for the second gas and electrolyte circuit which is directly behind it. In the cell members of the combustion material element the two gas and electrolyte circuits run separately, each in two parallel channels in the longitudinal direction of the cell body; two supply channels extend underneath the cells and two outlet channels extend above the cells.

Insulated within a pressure vessel 1 is the cell body 2 which consists of individual electrolyte and electrode spaces. The electrodes 3 which form separating walls are shown in Figure 1 as being connected bipolar and separated by diaphragms 4. In this manner electrolye spaces 5 and 6 are formed on both sides of the diaphragms. All the electrolyte spaces 5 are traversed by one gas or gas electrolyte mixture and all electrolyte spaces 6 are traversed by another gas or gas electrolyte mixture. The electrolyte spaces open alternately into the one or the other of the separate supply cells at the bottom and likewise at the top they open alternately into one of the outlet channels. Of the four channels only one supply channel 14 and one outlet channel 15 are shown. One gas electrolyte, for example hydrogen with alkali solution flows in these two channels. The other gas electrolyte, for example oxygen with alkali solution flows in the other channels which are not shown. The gas electrolyte- and the electrolyte-circulating conduits are preferably arranged outside the pressure vessel as described hereinafter so that they may be heated and cooled. The hydrogen-electrolyte conduits and the oxygen-electrolyte conduits must be kept separate in order to avoid mixing the gases, since this would give rise to losses. The following description of the hydrogen-electrolyte circuit applies equally well to both sets of channels and the circuits connected thereto.

The hydrogen necessary in operating the device as a combustible material element is conducted under pressure through the tube 7 into the vessel 8 where it mixes with the unused gas escaping from the electrolyte circuit and is drawn off through the tube 9 by a circulating pump 10 and is forced or sprayed through the tube 11 by means of nozzles into the electrolyte in a vessel 12. In this case the electrolyte consists of alkali solution, for example KOH and flows through the tube 13 to the vessel 12.

The cold lye saturated with gas and also mixed with gas in the vessel 12 flows into the channel 14 and from here it passes into the corresponding cell spaces 5, whereupon a part of the hydrogen is given up to the electrodes. On account of the conversion into water and electrical energy the electrolyte is warmed since it is traversed by the electric current and collects again in the longitudinal channel 15. From the longitudinal channel 15 the electrolyte is impelled by the driving force of the gas bubbles still present in it through the tube 16 into the vessel 8 where the unused gas mixes with that which is newly introduced. The electrolyte flows through the tube 17 and then through the connected tube 13 into the vessel 12 again where it is again mixed with gas. The tube 17 is surrounded by a cooling jacket 18 which is traversed by a cooling agent, for example water, in order again to cool the electrolyte.

The cell member, from which the electrical energy produced is conducted away through the current conduits 25 and 26, is electrically insulated in the pressure vessel 1, the wall of which leaves free a space 19 between it and the cell member. This space is traversed by a gaseous or liquid electrically insulating substance or is filled with such a substance which surrounds the cell member.

In the present case a liquid insulating medium is employed which is contained in the vessel 21 and is conducted to the pressure chamber 1 through the tube 20. The vessel 21 is connected by means of the tube 22 with a gas conduit and in this case with the hydrogen gas conduit 9 so that the insulating agent exerts approximately the same pressure on the cell member as the electrolyte.

If the cell member is surrounded with a gaseous insulating agent the hydrogen is preferably conducted from the vessel 8 through the tube 23 to the pressure vessel 1 and leads it through the tube 24 which leads to the pump. With this arrangement naturally the tube 9 is omitted.

In both cases the filling with the insulating agent or the passing of an insulating agent has for its object to lead away with the stream of insulating medium any electrolyte fluid escaping from the cell owing to lack of fluid tightness in order to ensure continuous satisfactory insulation.

For the regulation of the electrolyte circulation the return flow tube 13 is provided with a throttle valve 27. The gas circulation can be regulated as well as by the pump 10 also by means of a throttle valve 28. Since the reaction velocity and the efficiency of the plant increase with the operating temperature, the uprising tube 16 is provided with heating means 29 in order to be able to maintain as high as possible an operating temperature even with small load. In the case of normal current output, therefore, the electrolyte is so heated as a result of the current flow therethrough that it must be cooled by means of the cooling means 18.

The water formed during the operation of the gas battery is removed continuously or intermittently, and the thus concentrated electrolyte returned. For this purpose, in the illustrated form, a part of the lye in the return tube 17 is continuously removed through the tube 31 or 31' respectively which can be connected before or after the cooling device 18. The tube 31 or 31' respectively leads to a cylinder in which under the pressure of the dilute lye and the release of the gas dissolved in it, a piston 30 moves back and forth which forces the dilute lye entering the cylinder upon one stroke of the piston through the tube 32 into an evaporating boiler 33 upon the reverse stroke. This piston 30 works together with a piston 30' which forces the concentrated lye entering through the pipe 35 upon one stroke, through the pipe 26 into the pipe 13 on the reverse stroke. The evaporating boiler is heated by any suitable means, for example by means of a burner 34 and in this way evaporates the excess water. The various inlet and outlet cocks or valves with which the apparatus is provided are not shown. The water vapour issuing from the evaporating boiler 33 is condensed and if desired, if the evaporating plant works under pressure, it is utilized by expansion for doing work.

In operating the element as a current producer the hydrogen electrodes become charged negatively, the oxygen electrodes become charged positively and so produce the required potential at the terminals 25 and 26 continuously.

If now the device is not operated as a combustible material element but as a pressure decomposer, then the current conduits are connected to the generator, that is to say, the generator current is lead to the terminal 25 and conducted away at the terminal 26, if previously in operating as a combustible material element the terminal 25 was the positive and the terminal 26 the negative pole of the current source. In operating as a decomposer the gas circulating pump is stopped. The hydrogen produced in the cells collects in the channel 15 and rises mixed with electrolyte through the uprising tube 16 into the vessel 8. The electrolyte flows whilst being cooled through the tube 17 into the tube 13 and from here into the channel 14 and back into the individual cells. The gas produced flows through the pipe 7 into the pressure storers 60 which are connected individually by means of valves 61 with the pipe 7. The pressure vessels 60 which are first filled with water receive the gas whilst a corresponding quantity of water escapes at the bottom through the valves 62 into the pipe 63 and from there through an automatically controlled regulating valve 64 into a collecting trough 65.

The water necessary for decomposition is taken from a water container 66 by means of a pump 67 and forced into the pipe 13 from which it reaches the cells. The container 66 contains as much water as is necessary for the decomposition process. Water is supplied to the container 66 again in operating the combustion material elements in that the water vapour produced in the evaporator 33 is condensed in the pipe 68 by supplying a cooling agent to the cooling jacket 69, and reaches the container 66 as condensate, whilst the gas escapes through the receiver 70. The receiver prevents the water from absorbing carbon dioxide from the air.

In operating the device as a combustible material element the gas in the collecting containers 60 is forced through the pipe 7 into the vessel 8 in that the water in the collecting chamber 65 is forced by means of a pump 71 through an automatic regulating valve 72 into the pressure containers 60. The measuring instruments, manometers, differential pressure meters and so forth with which the plant is provided are not shown in order not to complicate the general view in the drawings.

Figure 2:
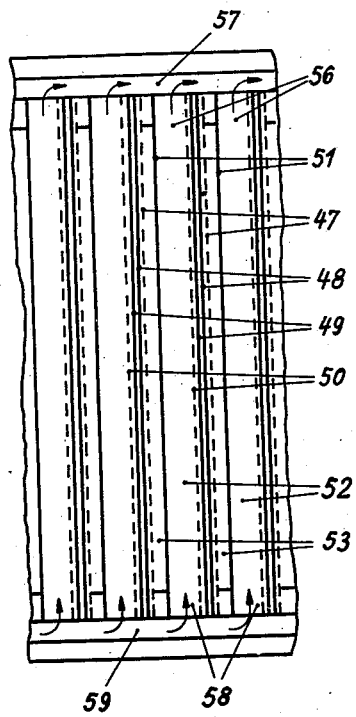
Figure 2 shows to an enlarged scale a part of the electrode arrangement in the case of bipolar connections.
Figure 3:
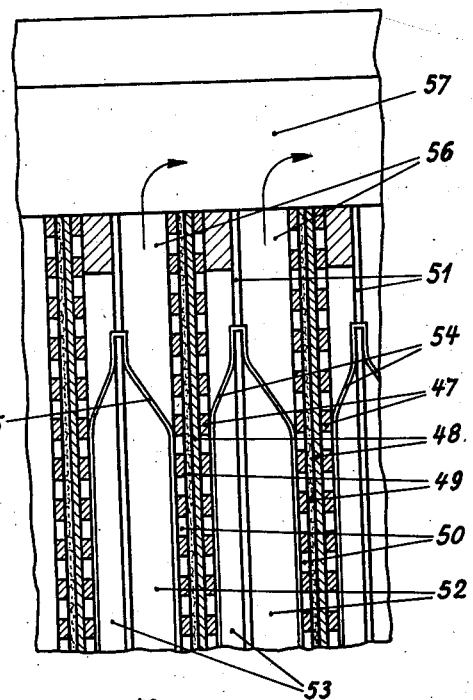
Figure 3 shows to a still larger scale the upper part of what is shown in Figure 2.

Figure 2 shows the arrangement of the electrodes in the case of the bipolar connection employed in the whole arrangement (Figure 1) in which on one side of the separating walls 51 oxygen and on the other side hydrogen is used up or produced. The separating walls are as shown to an enlarged scale in Figure 3 connected on both sides with special perforated electrodes. On the one side they press the oxygen electrodes 47 which are connected with them by means of rods 54 against small carbon plates 48 and again they press these on asbestos diaphragms 49 and on the other side the hydrogen electrodes 50 are pressed by means of rods 55 against the other side of the diaphragms 49. The hydrogen and the electrolyte flow through the electrolyte spaces 52 and reach the collecting channel 57 through openings 56. The hydrogen and the electrolyte or in operating as a pressure decomposer respectively the electrolyte alone is/are supplied through the common channel 59 through the openings 58 (see Figure 2). The oxygen flows with the electrolyte through corresponding channels and openings which are not shown as well as through the electrolyte spaces 53.

Figure 4:
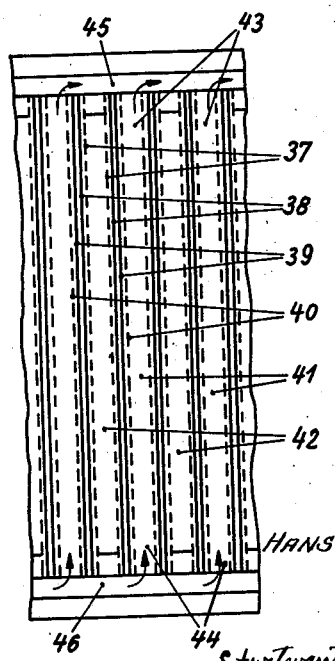
Figure 4 shows a part of the electrode arrangement in the case of parallel connection.

Figure 4 shows to a somewhat enlarged scale the arrangement of the electrodes and diaphragms in cell members for the case when the electrodes are connected in parallel and consist of perforated sheets.

The oxygen electrodes 37 which consist of nickel, or nickelled iron are perforated and lie adjacent to porous carbon sheets 38 which serve for activating the oxygen. The carbon sheets 38 are on their sides firmly pressed by means of the oxygen electrodes against the diaphragms 39 which preferably consist of hard or soft microporous rubber or asbestos board and can be comparatively thin (0.4 mm., for example). From the other side the hydrogen electrodes 40 consist of iron pressed on the diaphragms. By arranging such units in sequence electrolyte spaces 41 and 42 are obtained which are bounded on both sides by electrodes. The hydrogen electrolyte spaces 41 are connected at the top and the bottom with common channels 45 and 46 through openings 43 and 44. Also the oxygen electrolyte spaces 42 are connected through openings with similar common channels which are not shown in the drawings. The oxygen and hydrogen electrodes can be provided on the surfaces directed towards the electrolyte spaces with thin layers of the elements of groups 5, 6, and 7 of the Periodic System, that is for example, with platinum and tantalum, palladium and so forth, which as is known, are particularly suitable.

The electrode material should be insoluble and unchangeable so far as possible, under the action of the electrolyte, in the electrolyzer and in the regenerator or combustible material element, and should be of good conductivity to avoid loss of current efficiency. As indicated above, two different materials may be used for the two gas-electrolyte mixtures, each particularly suited for its intended purpose, these materials then being connected together electrically, by being pressed firmly together or welded, or formed one upon the other by galvanic coating. The active material already described can be applied in holes, pores or the like of the material, or may be used as a coating or attachment to the current conducting material proper. When carbon is used as an active layer, it may be embedded between the permeable electrode and the diaphragm and thus assists in protecting the diaphragm against mechanical strain and protecting the pores against widening by reason of electrolyte penetrating the diaphragm.

I claim:—

1. A method of storing and re-converting the energy of electric currents, which comprises electrolyzing a liquid electrolyte medium in a compartment to produce a gas, separating the gas from the electrolyte and storing the gas under pressure, thereafter re-mixing the gas and electrolyte and returning the mixture to an electrolyzing compartment, and effecting a re-conversion of the energy to the form of electric current while maintaining the mixture under a constant pressure of not less than ten atmospheres and at a temperature between the boiling point at atmospheric pressure and the boiling point at the operating pressure and while removing the product of combination of said gas from the electrolyte for controlling the concentration thereof.

2. A method of storing and re-converting the energy of electric currents, which comprises electrolyzing an aqueous electrolyte medium in a compartment to produce a gas, circulating the electrolyte medium through the compartment and an external path while maintaining the pressure thereof at not less than ten atmospheres and maintaining the temperature at a point between the boiling point at atmospheric pressure and the boiling point at the operating pressure, removing the gaseous product from the circulation at a point in said external path during the storage phase and preserving said gas under pressure, introducing the gas into the electrolyte medium and returning the mixture into the compartment during the re-conversion phase whereby to produce the electric current, while maintaining the mixture under a constant pressure in said cell of not less than ten atmospheres and at a temperature between the boiling point at atmospheric pressure and the boiling point at operating pressure, and removing water from the circulating electrolyte at a point of said external path during the re-conversion phase.

3. An apparatus for storing and re-converting the energy of electric currents, which comprises means for providing an electrolytic cell having a diaphragm for separating independent electrode compartments, means including conduits for maintaining independent circulations of aqueous electrolyte through the compartments, means for removing water from the electrolyte in said conduits at a point externally of the cell, gas separators included in said conduits for collecting the gases of the compartments separately, separate pressure storage vessels for the collected gases, and separate reintroduction means for bringing the gases back into mixture with the electrolyte prior to the re-entry of the latter into the corresponding compartment and including pump means for maintaining in the cell during reconversion a pressure of not less than ten atmospheres, and means for heating the mixture to a temperature between the boiling point at atmospheric pressure and the boiling point at the operating pressure.

4. An apparatus for storing and re-converting the energy of electric currents, which comprises means for providing an electrolytic cell having a diaphragm for separating independent electrode compartments, means including conduits for maintaining independent circulations of aqueous electrolyte through the compartments, gas separators included in said conduits for collecting the gases of the compartments separately, separate pressure storage vessels for the collected gases, and separate reintroduction means for bringing the gases back into mixture with the electrolyte prior to the re-entry of the latter into the corresponding compartment and including pump means for maintaining in the cell during re-conversion a pressure of not less than ten atmospheres, and means for heating the mixture to a temperature between the boiling point at atmospheric pressure and the boiling point at the operating pressure, said circulation-maintaining means and reintroduction means including devices for removing water from the circulating electrolyte and devices for maintaining a substantially constant pressure in the cell during electrolysis and re-conversion which is not less than ten atmospheres.

5. A method of generating electrical energy from hydrogen and oxygen gases and by the use of insoluble electrodes in individual cell compartments and circulating electrolytes, which comprises mixing the gases and electrolytes and circulating the same through the individual compartments of the cells, maintaining the mixtures under a pressure of not less than ten atmospheres and at a temperature between the boiling point at atmospheric pressure and the boiling point at the increased pressure for effecting a combustion of the gases in the cell and the delivery of current from the electrodes, and removing water from the circulating electrolytes for maintaining the relative concentration of said mixtures.

6. A method of storing and reconverting the energy of electric current, which comprises electrolyzing a liquid electrolyte medium in a compartment to produce a gas; maintaining an active circulation of the electrolyte medium from and to the compartment; separating the gas from the electrolyte in its circulation; maintaining the pressure during electrolysis, circulation and separation substantially constant and at not less than 10 atmospheres, and maintaining the temperature during electrolysis, circulation and separation between the boiling point at atmospheric pressure and the boiling point at the operating pressure; storing the separated gas under a pressure of not less than 10 atmospheres; and thereafter remixing the gas and electrolyte and actively circulating the mixture through the compartment and effecting a reconversion of the energy to the form of electric current while maintaining the circulating mixture under a constant pressure of not less than 10 atmospheres and at a temperature between the boiling point at atmospheric pressure and the boiling point at the operating pressure and while removing the product of combination of said gas from the electrolyte for controlling the concentration of the electrolyte.

HANS NIEDERREITHER.